June 3, 1969 T. C. CHISNELL ET AL 3,448,208

SYNTHETIC THREE-D DISPLAY

Filed July 11, 1966 Sheet 1 of 2

INVENTORS
THOMAS C. CHISNELL
ROBERT E. WINTER

BY Homer L. Knearl

AGENT

United States Patent Office 3,448,208

Patented June 3, 1969

3,448,208
SYNTHETIC THREE-D DISPLAY

Thomas C. Chisnell, Arlington, and Robert E. Winter, Falls Church, Va., assignors to International Business Machines Corporation, Armonk, N.Y., a corporation of New York Filed July 11, 1966, Ser. No. 564,327
Int. Cl. H04n 9/58; G06f 3/14
U.S. Cl. 178—6.5 9 Claims This invention relates to the synthesis of right and left views of three-dimensional data. It is well known to generate right and left views of three-dimensional data in order to produce a three-dimensional display of the data. In the past, these right and left views have been approximations to the actual right and left views of the three-dimensional data. The effect has been to induce an appearance of a three-dimensional display, but the display has not been rigorous, true and accurate. We, on the other hand, have invented a system for producing right and left views of three-dimensional data which are not approximations, but are true, rigorous and accurate right and left views. These views may be used to create a true three-dimensional image of the data being displayed.

For many years, stereo cameras have been producing right and left views of real objects. It is common knowledge that such right and left views will produce a stereoscopic image to an observer when viewed through a stereoscopic viewing device. A problem arises, however, when what is to be displayed is three-dimensional data rather than real objects. The problem is how to synthesize a right and left view of a data point defined by three coordinates in space.

An approximate solution to this problem has been achieved in the past by producing right and lift images having a separation directly proportional to the depth coordinate of the data point. In operation, this solution adds a proportional part of the depth coordinate to the right and left $x$—$y$ coordinates in order to locate points representing the right and left views of the data point. This induces an impression of three-dimensional display because, when right and left coordinate systems are superimposed, the data point in the left view will be displaced from the data point in the right view. The eye corrects for this displacement by making a superposition of the points in the mind of the observer. The displacement is interpreted by the mind as being due to the depth of the data point.

The inaccuracy in this approximate solution can be seen by observing the effect of changing the depth coordinate of the data point. As the depth increases the displacement between the right and left views increases in direct proportion. Therefore, as the depth coordinate approaches infinity, the separation of the right and left views also approaches infinity. In effect the eyes of an observer would no longer be able to superimpose the right and left views displayed by this approximate system. Thus, this approximate system greatly distorts the depth perception of the observer, and for large depth of field the approximate system becomes completely unusable.

In a true system on the other hand, the distance between the right and left views would approach a limit. If the depth coordinate were infinity in a true system, the separation between right and left views would be the eye base of the observer (distance between the optical axes of the eyes).

Another shortcoming of the approximate system is that it does not permit an observer to control his display. The control problems are basically threefold. Given a point in three-dimensional space, an observer of a display of that data point may wish to change the perspective of the display as if his viewing point were changed. He may wish to look at the data point from a point more to the left or more to the right or from a higher or lower vantage point. This ability to change the given effective viewing point will be referred to as perspective control. Known systems, which approximate synthetic three-dimensional display, are not related to a viewing point and therefore do not contain the ability of perspective control.

The two other controls desirable in three-dimensional displays are known as depth exaggeration and zooming. These effects are accomplished by modifying the depth coordinate of the data point being displayed. Distortion in the approximate system discussed above greatly limits that system's capability to accomplish these effects. As previously pointed out, any great change in the depth coordinate in the approximate system adds considerable distortion to the display and eventually makes the display unusable. Therefore, any modification of the depth coordinate to produce zooming or depth exaggeration is very limited in the approximate system by the inherent distortion of the system.

It is an object of this invention to produce for three-dimensional display right and left views of three-dimensional data relative to a given, effective viewing point wherein the right and left views are completely true, accurate and undistorted.

It is a further object of this invention to change the perspective or the effective viewing point of synthesized undistorted right and left views of three-dimensional data.

It is a further object to zoom the synthesized, undistorted right and left views of the three-dimensional data.

It is a further object to exaggerate the depth coordinate in synthesized, undistorted right and left views of three-dimensional data.

In accordance with this invention, the above objects are accomplished in a system which synthesizes right and left views of data points defined by three coordinates in space. The system is based on one point perspective relative to right and left vanishing points. The right vanishing point is the orthogonal projection of a given right viewing point onto the display plane, and similarly the left vanishing point is the orthogonal projection of a given left viewing point onto the display plane. The objects are accomplished by calculating a depth perspective ratio dependent upon the relative depth positions of the given viewing points, the display plane and the data point, and by using the depth perspective ratio to locate the position of right and left points on the display plane which represent right and left views of the data point. Calculating devices can be used to determine the depth perspective ratio and the right and left line-of-sight distances on the display plane. The right and left line-of-sight distances on the display plane are the distances from the right and left vanishing points to the orthogonal projection of the data point on the display plane. To obtain the position of the right and left points representing the right and left views of the data point, the right and left line-of-sight distances on the display plane are apportioned according to the depth perspective ratio.

In addition, the perspective control object of the invention is accomplished by moving the vanishing points on the display plane and thereby changing the perspective of the field of data points. The depth exaggeration object and the zooming object of the invention may be accomplished by modifying the depth coordinate of the data points. To achieve zooming it is only necessary to add a constant to the depth coordinate of all the data points. To achieve depth exaggeration the depth coordinates of all the data points must be multiplied by a constant factor.

In either modification the effect is to change the depth perspective ratio and thereby change the right and left views.

The following are a few of the advantages of our invention. First, the right and left views represent true right and left views and not aproximate views. Furthermore, being a true and accurate view any change in the depth of the data points does not cause a distortion in the right and left views. Second, the perspective of the display may be changed by moving the vanishing points on the display plane and by determining the right and left views relative to the new location of the vanishing points. Third, the effective viewing point of the observer may be brought closer to the data points by adding a constant to the depth coordinate of the data points. Fourth, the separation of data points in the depth dimension may be exaggerated by multiplying the depth dimension by a constant factor. Since the left and right views represent true and accurate pictures, all of the control features represented by the second, third and fourth advantages can be carried out substantially free from distortion.

The foregoing and other objects, features and advantages of the invention will be apparent from the following more particular description of a preferred embodiment of the invention, as illustrated in the accompanying drawings.

Figure 1:
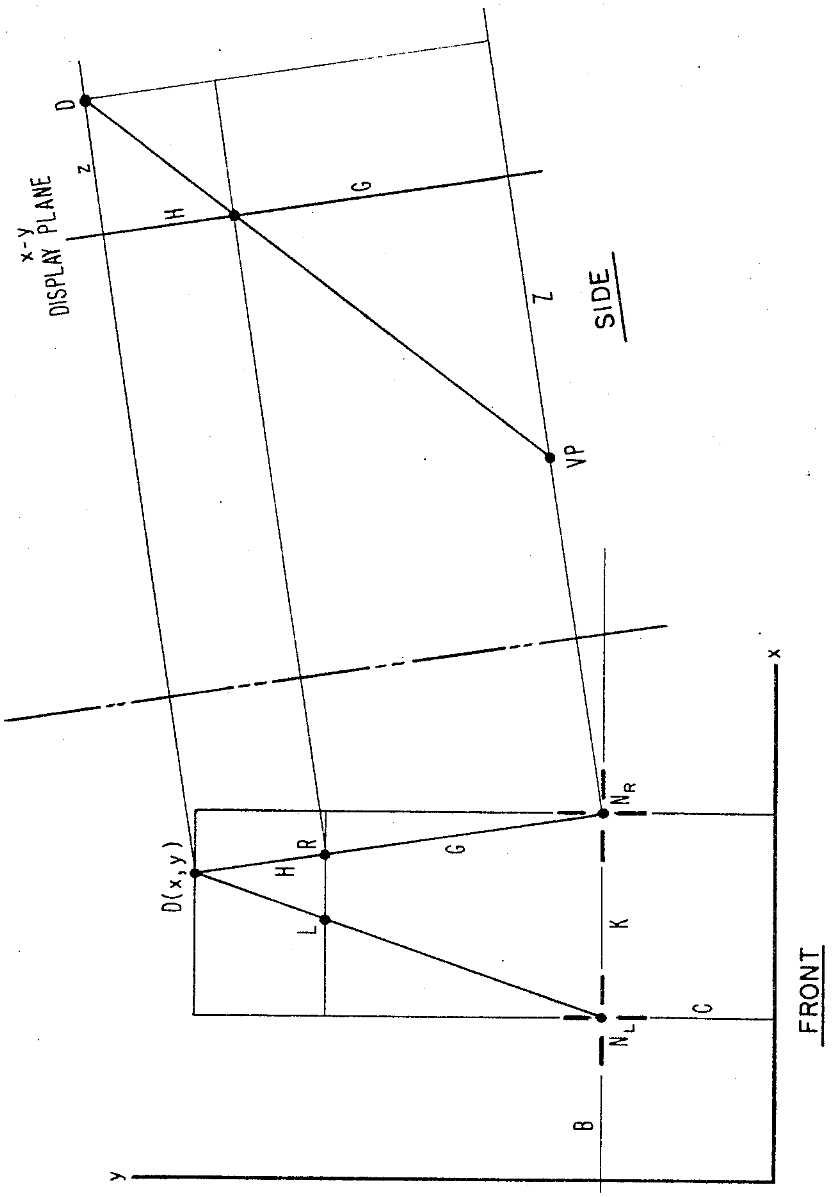
FIG. 1 shows the geometry for the theory behind the invention.

Referring now to FIG. 1, the solid geometry underlying the invention is shown. A front view shows the $x$–$y$ display plane, while a side view shows the depth dimensions. In the side view, the given, effective viewing point is indicated as point VP, while the data point is indicated by a D. The line drawn from point VP to point D represents the line-of-sight of an imaginary observer at point VP as seen from the side. Hereinafter, the optical axis of the eye of the imaginary observer looking off to infinity in a direction orthogonal to the $x$—$y$ display plane is referred to as the vanishing line. The point where the vanishing line intersects the display plane is referred to as the vanishing point.

In the front view, the vaninshing points $N_L$ and $N_R$ are shown on the $x$—$y$ display plane. The left vanishing point $N_L$ represents the vanishing point for the left eye of the imaginary observer, while the right vanishing point $N_R$ represents the vanishing point for the right eye of the imaginary observer. The distance between the vanishing point $N_L$ and the vanishing point $N_R$ is the effective eye base denoted by the letter K in FIG. 1. An actual eye base is the distance between the optical axes of the eyes of an actual observer looking off to infinity. The effective eye base K can be any distance, but during observation of the final views by an actual observer, the effective eye base must be converted by optical means to the approximate actual eye base of the actual observer. The position of the left vanishing point $N_L$ is B units along the $x$ axis and C units along the $y$ axis of the display plane, while the location of the right vanishing point $N_R$ is K units to the right of the left vanishing point $N_L$. In the front view, the data point D is shown on the $x$—$y$ plane and is located at coordinates $x$, $y$. The line drawn from the right vanishing point $N_R$ to the data point D represents the right line-of-sight of the imaginary observer as projected on the $x$—$y$ display plane. Likewise, the line drawn from the left vanishing point $N_L$ to the data point D represents the left line-of-sight of the imaginary observer as projected on the $x$—$y$ display plane. Somewhere along the right and left lines-of-sight are located the points R and L which represent the right and left views of the data point on the $x$—$y$ display plane. These points in fact represent the points where the actual right and left lines-of-sight pierce the $x$—$y$ display plane. Therefore the location of the points L and R depends upon the distance of the imaginary observer from the display plane and the depth coordinate $z$ of the data point.

To determine where the actual line-of-sight pierces the $x$—$y$ display plane, reference is made to the side view in FIG. 1. The side view shown is taken by means of a folded plane and is parallel to the right line-of-sight. The viewing point VP of the observer is a distance Z from the $x$—$y$ display plane along the vanishing line. The data point is, or course, a distance Z from the display plane along a line orthogonal to the display plane. By similar triangles, it follows that:

$$\frac{Z}{Z+z}=\frac{G}{G+H}$$

In the above equation, G represents the distance as shown in FIG. 1 from point R to the right vanishing point $N_R$. From this equation, it can be seen that the distance from the right vanishing point $N_R$ to the point R can be obtained by multiplying the right line of sight distance on the display plane by the factor $$\frac{Z}{Z+z}$$

the depth perspective ratio.

The depth perspective ratio can be similarly applied to the left line of sight distance on the display plane to locate the point L. This is true because the same depth perspective ratio is obtained whether the side folding plane view is taken parallel to the right line-of-sight or the left line-of-sight. Therefore, point L may be simply obtained by multiplying the left line-of-sight distance by the depth perspective ratio.

With the basic geometry for obtaining the two-dimensional stereo views in mind, three very useful stereo optical manipulations may be performed to aid an actual observer viewing synthesized right and left views. First, the perspective of the data field being viewed can be changed by simply changing the values of B and C and thereby moving the vanishing points and thus the given viewing point relative to the data points.

Second, the effect of zooming in on the data for a close-up can be achieved by adding or substracting a constant to the $z$ coordinate of all the data. Referring to FIG. 1 it can be seen that if a constant were subtracted from the $z$ coordinate of the data point D the display plane would be moved closer to the data point and therefore the data displayed would appear to be closer.

The third manipulation referred to as depth exaggeration is accomplished by multiplying the $z$ coordinate of all the data points by a constant. This effectively exaggerates the depth between two points. For example, if the $z$ coordinates of two points are 1 and 5, and if the vertical exaggeration is by a factor of 10, then the new $z$ coordinates will be 10 and 50.

The following equations express in Cartesian Coordinates the above theory for determining the coordinates of points L and R in FIG. 1.

$$x_R=\frac{Z}{Z+nz+k}(x-B-K)+B+K$$

$$x_L=\frac{Z}{Z+nz+k}(x-B)+B$$

$$y_{LR}=\frac{Z}{Z+nz+k}(y-C)+C$$

The constants $n$ and $k$ shown in the equations do not appear in FIG. 1. The purpose of $n$ is to multiply the depth dimension to obtain depth exaggeration. The purpose of $k$ is to add a constant (usually negative) to obtain zooming. In normal operation $n=1$ and $k=0$.

Figure 2:
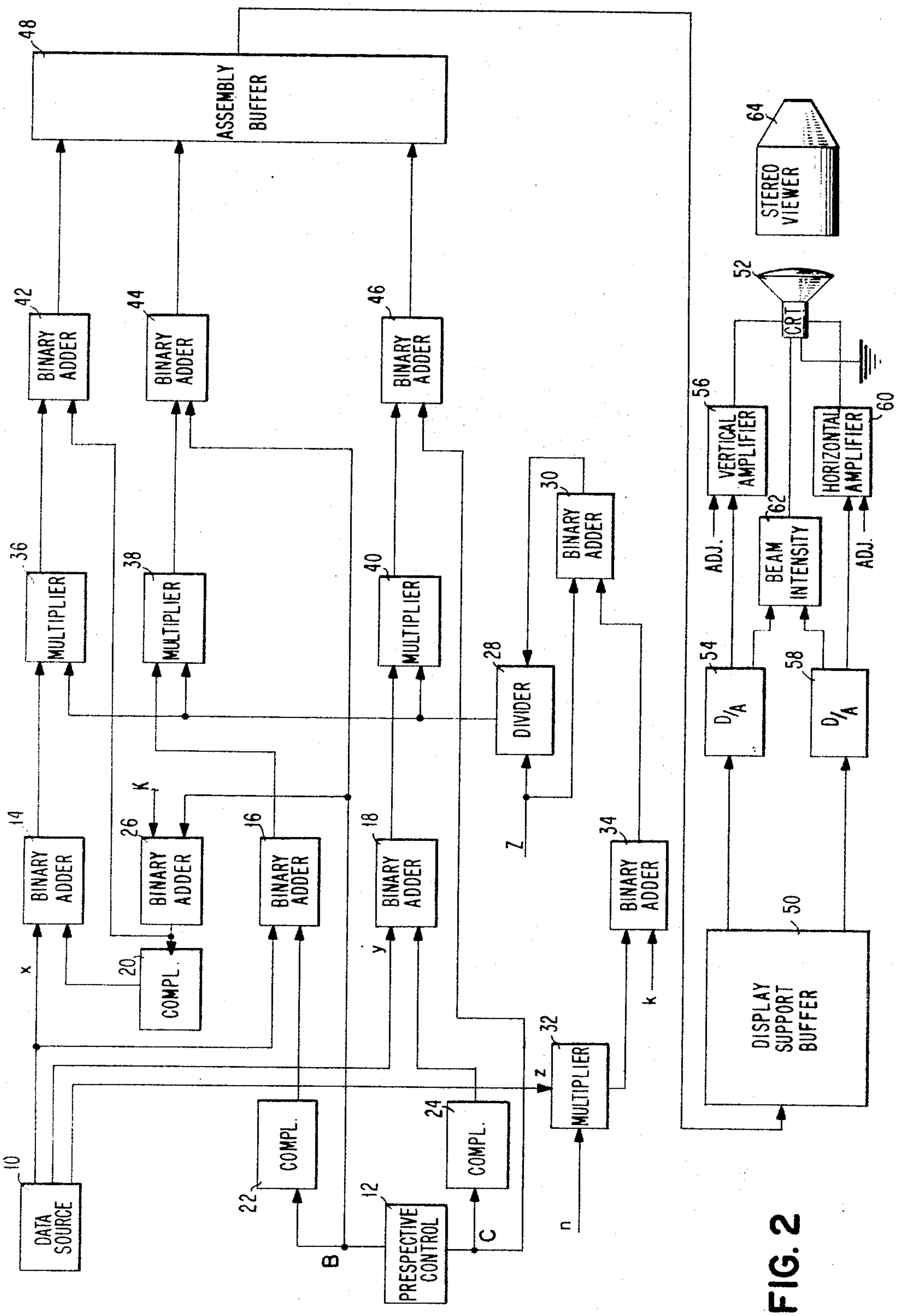
FIG. 2 shows the preferred embodiment of the invention.

Referring now to FIG. 2, the preferred embodiment for implementing the invention is shown. Data source 10 provides the *xyz* coordinates of data points to be displayed. Perspective control 12 provides the coordinates of the left vanishing point on the display plane. Because the right vanishing point is fixed relative to the left vanishing point, the perspective control effectively controls the position of both vanishing points on the display plane. Binary adders 14, 16 and 18 act to calculate the *x*—*y* line-of-sight distance from the left and right vanishing points to the data point D on the display plane. Complementing circuits 20, 22 and 24 complement one input to each of the above binary adders. The purpose for complementing this input is to operate the above address as subtracting circuits. Binary adder 26 is provided to add the effective eye base K to the horizontal position of the left vanishing point and thereby establishing the position of the right vanishing point.

To calculate the depth perspective ratio, divider 28 divides the distance Z by the distance Z plus the depth coordinate *z*. The depth coordinate *z* is added to the effective viewing point distance Z by binary adder 30.

To provide for the features of zooming and vertical exaggeration, the depth coordinate *z* is modified prior to being added by binary adder 30. First, depth coordinate *z* is modified in multiplier 32 by being multiplied by the factor *n*. The purpose of multiplier 32 is to provide for depth exaggeration. After the multiplier, the depth coordinate *z* is modified by having a constant *k* added to it in binary adder 34. The purpose of binary adder 34 is to provide for zooming by adding a constant to the depth coordinate. Effectively, binary adder 30 then receives the depth coordinate modified to read $nz+k$ where *n* is 1 and *k* is 0 when zooming and depth exaggeration are not desired.

To calculate the effect of the depth perspective ratio upon the line-of-sight distances between the vanishing points and the data point D on the *x*—*y* display plane, multipliers 36, 38 and 40 are provided. Multiplier 36 receives the depth perspective ratio from divider 28 and the *x* distance from the right vanishing point $N_R$ to the data point D from binary adder 14. The output of the multiplier is the *x* distance from the right vanishing point $N_R$ to point R. Likewise, multiplier 38 receives the depth perspective ratio from divider 28 and the *x* distance from the left vanishing point $N_L$ to the data point D from binary adder 16. The output from multiplier 38 is the *x* distance from the left vanishing point $N_L$ to the point L. Finally, multiplier 40 receives the depth perspective ratio from divider 28 and the *y* distance from either vanishing point to the data point D. The output of the multiplier 40 is the *y* distance from either vanishing point $N_L$ or $N_R$ to its associated point L or R. As previously stated points L and R on the display plane represent respectively the left and right views of the data point D.

To determine the *x* and *y* coordinates of points L and R binary adders 42, 44 and 46 are provided to add the coordinates of the vanishing points to the distances calculated by multipliers 36, 38 and 40. Binary adder 42 adds the *x* distance of the right vanishing point to the distance calculated from the right vanishing point $N_R$ to point R. Binary adder 44 adds the *x* coordinate of the left vanishing point to the *x* distance from the left vanishing point $N_L$ to point L. Binary adder 46 adds the *y* coordinate of either vanishing point to the *y* distance from either vanishing point $N_L$ or $N_R$ to its associated point L and R.

The purpose of assembly buffer 48 is to assemble the *x* and *y* coordinates of points L and R in preparation for displaying them on a cathode ray tube. The coordinates are assembled in the following sequence: $(x_1y_1)_L$, $(x_1y_1)_R$, $(x_2y_2)_L$, $(x_2y_2)_R$, $(x_3y_3)_L$, $(x_3y_3)_R$, etc. where 1, 2, 3 etc. denote different data points and L and R denote left and right views.

Display support buffer 50 receives the *x* and *y* coordinates and stores the information for display. The purpose of the display support buffer is to permit a cyclic rescan of its contents to repaint the displayed images on a cathode ray tube. As is well known, a cathode ray tube phosphor retains an image for a short length of time. Therefore to produce a sustained image it is necessary to cyclically repaint the image on the cathode ray tube.

To display the data stored in the support buffer, cathode ray tube 52 and associated horizontal and vertical scan control circuits and a spot intensity circuit are provided. The vertical scan control consists of digital-to-analog converter 54 and vertical amplifier 56. The horizontal scan control consists of digital-to-analog converter 58 and horizontal amplifier 60. The purpose of the digital-to-analog converters is to convert the data received from the display support buffer from digital signals to analog signals. The purpose of the amplifiers is to amplify these analog signals so that they may be used to control the deflection of the beam in the cathode ray tube. Amplifiers 56 and 60 also have an adjust input so that the display pattern on the cathode ray tube may be centered. The purpose of the beam intensity circuit 62 is to temporarily energize the beam of the cathode ray tube when the beam is properly positioned. The beam is energized when the digital-to-analog converters generate an output for each given digital coordinate input. The beam is on only long enough to produce a spot on the display surface.

To view the stereo display of the cathode ray tube, it is necessary to provide the observer with a stereo viewer 64. This stereo viewer could be one of many well known viewers such as polarized light filters, different colored light filters, or other optical structures to separate the left and right views and pass them to the left and right eyes of the observer.

In operation, data source 10 provides the *xyz* coordinates of the data point to be synthesized in a stereo projection. The coordinates of the left vanishing point are provided by perspective control 12 while binary adder 26 adds the effective eye base K to the *x* dimension of the left vanishing point. With the right and left vanishing points thereby fixed, binary adders 14, 16 and 18 calculate the *x* and *y* distances from the vanishing points to the data point.

Meanwhile the divider 28 is calculating the depth perspective ratio. The modified depth coordinate *z* is fed to binary adder 30 which adds the modified coorinate *z* to the effective viewing point distance Z. Binary adder 30 provides the other input to divider 28 and the resultant calculation is the depth perspective ratio. The depth perspective ratio is then used to apportion the distances supplied from the binary adders 14, 16 and 18 by multiplying in multipiers 36, 38 and 40 these distances by that ratio. The output from the multipliers is the *x* and *y* distances from the vanishing points to the points L and R on the display plane.

To locate points L and R on the stereo display plane, it is necessary to add the coordinates of the vanishing points to the distances calculated by multipliers 36, 38 and 40. This is accomplished by adders 42, 44 and 46.

Assembly buffer 48 then assemblies the *x* and *y* coordinates of points L and R received from adders 42, 44 and 46. The purpose of the buffer is to assemble them in a horizontal fashion so that horizontal scans on the cathode ray tube will paint first the left point L and then the right point R, i.e., $(x_1y_1)_L$, $(x_1y_1)_R$, $(x_2y_2)_L$, $(x_2y_2)_R$, etc.

From the assembly buffer the coordinates pass to the display support buffer which stores all the points for a complete display on the surface of the cathode ray tube. The display support buffer has a cyclic output so that the image on the surface of the cathode ray tube is cyclically repainted. The cyclic sweep of the display support buffer not only controls the flow of data from the buffer but also controls the flow of data into the buffer from the assembly buffer. In this way the sequence of scan for successive display points is maintained.

The display system receives the $x$—$y$ coordinates of spots to be displayed. These $x$—$y$ coordinates are expressed in digital form and must therefore be converted to analog form by the digital-to-analog converters 54 and 58. Each time the converters generate an analog signal for a given digital input, a trigger signal is sent to the beam intensity circuit 62. When the intensity circuit has received the trigger signal from each digital-to-analog converter the electron beam is temporarily intenstified to produce a spot on the screen of the cathode ray tube. In effect, the spot is generated on the display plane when the electron beam is positioned according to the coordinates fed the digital-to-analog converters. The positioning of the beam is, of course, controlled by the horizontal and vertical amplifiers 56 and 60 which act on the deflection plates of the cathode ray tube 52.

The left and right stereo images projected onto the surface of the cathode ray tube may then be viewed by an observer looking through the stereo viewer 64. As previously pointed out, the stereo viewer may take on many of the well-known forms, one of which might be polarized light filters. The stereo viewer must also contain optical apparatus to adjust the effective eye base displayed on the cathode ray tube to the approximate actual eye base of the observer. If the effective eye base is too wide and no correction is applied, the observer will not be able to merge the two views into a three-dimensional image.

The structural system just described is only one example of many systems that could be used to implement our invention. Cartesian Coordinates were chosen in the preferred embodiment. However, one could easily change to Polar Coordinates or Cylindrical Coordinates and devise associated circuitry to implement the same functions defined in the claims. Similarly, we chose to operate with a digital system, but one skilled in the art will appreciate that it would be just as easy to operate with an analog system. For that matter, one skilled in the art could implement the invention in a mechanical manner. The final display plane whether it be paper, a projection screen, or the surface of a cathode ray tube is immaterial. One skilled in the art will also appreciate that many variations on the cathode ray tube could be used. For example, two cathode ray tubes could be used, one for the left and one for the right view. Similarly, a single cathode ray tube with two beams might also be used to achieve the left and right views. It will be understood by those skilled in the art that the foregoing and other changes in form and details may be made to the preferred embodiment of the invention without departing from the spirit and scope of the invention.

What is claimed is:

1. Apparatus for synthesizing on a display surface right and left views of a data point from the three coordinates in space which define the data point comprising:

- a data source for supplying the three coordinates of the data point;
- perspective control means for controlling the position of the right and left vanishing points on the display surface;
- first calculating means responsive to said data source and said control means for calculating the right and left line-of-sight distances on the display surfaces from each vanishing point to the orthogonal projection of the data point on the display point;
- second calculating means for calculating a depth perspective ratio where the numerator of the ratio is a first distance from an effective viewing point along either right or left vanishing line to the display surface and the denominator of the ratio is the sum of the first distance and a second distance from the data point to the display surface along a line orthogonal to the display surface;
- apportioning means responsive to said first and second calculating means for apportioning the right and left line-of-sight distances on the display surface by the depth perspective ratio to obtain the position of right and left points representing right and left views of the data point on the display surface.

2. The apparatus of claim 1 wherein said perspective control means is variable to move the right and left vanishing points on the display surface so that the perspective of the data point is changed.

3. Apparatus for zooming the right and left synthesized views of a data point defined by three coordinates comprising the apparatus of claim 1 and in addition:

- means for adding a constant value to the distance from the data point to the display surface along a line orthogonal to the display surface.

4. Apparatus for exaggerating the right and left synthesized views of a data point defined by three coordinates comprising the apparatus of claim 1 and in addition:

- means for multiplying by a constant value the distance from the data point to the display surface along a line orthogonal to the display surface.

5. Apparatus for producing a stereo display of three-dimensional data comprising the apparatus of claim 1 and in addition:

- displaying means responsive to said apportioning means for displaying on the display surface the right and left points;
- stereo viewing apparatus for conveying separately the image of the right and left points from the display surface to the right and left eyes respectively of the viewer.

6. Apparatus for synthesizing a stereo display from three-dimensional data defined by data points located in Cartesian Coordinates $xyz$ comprising:

- an $x$–$y$ display plane;
- a data source for supplying the $xyz$ coordinates of points being displayed;
- positioning means for positioning the left and right vanishing points on said display plane;
- first calculating means responsive to said data source and said positioning means for calculating the right and left line-of-sight $x$–$y$ distances from the right and left vanishing points to a data point;
- second calculating means for calculating a depth perspective ratio $$Z/Z+Z$$

where Z is the distance along either vanishing line from an effective viewing point to said display plane and $z$ is the depth coordinate of the data point;
- multiplying means responsive to said first and second calculating means for multiplying the right and left line-of-sight $x$–$y$ distances by the depth perspective ratio to obtain right and left apportioned distances;
- first adding means responsive to said multiplying means for adding the left $x$–$y$ apportioned distances to the $x$–$y$ coordinates of the left vanishing point respectively to obtain the $x$–$y$ coordinates of a left point representing the left view of the data point on said display plane;
- second adding means responsive to said multiplying means for adding the right $x$–$y$ apportioned distances to the $x$–$y$ coordinates of the right vanishing point respectively to obtain the $x$–$y$ coordinates of a right point representing the right view of the data point on said display plane;
- displaying means responsive to said first and said second adding means for displaying the left and right points on said $x$–$y$ display plane;
- stereo viewing apparatus for conveying separately the left and right points on said $x$–$y$ display plane to respectively the left and right eyes of the viewer.

7. The apparatus of claim 6 wherein said positioning means is variable to move the left and right vanishing points on the $x$–$y$ display plane so that the perspective of the data point is changed.

8. Apparatus for zooming the view synthesized by right and left projections of an $x$, $y$, $z$ data point on said $x$–$y$ display plane comprising the apparatus of claim 6 and in addition:

means for adding a constant value to $z$.

9. Apparatus for exaggerating the z dimension in a view synthesized by right and left projections of an $x$, $y$, $z$ data point on said $x$–$y$ display plane comprising the apparatus of claim 6 and in addition:

means for multiplying $z$ by a constant value.

References Cited

Electronic Engineering, Projective 3-Dimensional Displays, by D. M. MacKay, part I (July, 1949), and part I (August 1949).

Theory of Parallax Barriers, By S. H. Kaplan, July 1952, Journal of the SMPTE, vol. 59.

RALPH D. BLAKESLEE, *Primary Examiner.*

B. LEIBOWITZ, *Assistant Examiner.*

PO-1050
(5/69)

UNITED STATES PATENT OFFICE
CERTIFICATE OF CORRECTION

Patent No. 3,448,208 Dated June 3, 1969

Inventor(s) T. C. Chisnell et al.

It is certified that error appears in the above-identified patent and that said Letters Patent are hereby corrected as shown below:

Column 7, line 64, Claim 1, delete "surfaces" and insert -- surface --; line 66, delete "point" and insert -- surface -
Column 8, line 46, should appear as:

$$Z/Z + z$$

SIGNED AND
SEALED
AUG 18 1970

(SEAL)
Attest:

Edward M. Fletcher, Jr.
Attesting Officer

WILLIAM E. SCHUYLER, JR.
Commissioner of Patents